(12) United States Patent
Carlson et al.

(10) Patent No.: US 9,070,954 B2
(45) Date of Patent: Jun. 30, 2015

(54) SAFETY SHUTDOWN SEPARATORS

(75) Inventors: Steven Allen Carlson, Cambridge, MA (US); Ifenna Kingsley Anakor, Allston, MA (US); Greg Robert Farrell, Cape Neddick, ME (US)

(73) Assignee: Optodot Corporation, Woburn, MA (US)

( * ) Notice: Subject to any disclaimer, the term of this patent is extended or adjusted under 35 U.S.C. 154(b) by 1411 days.

(21) Appl. No.: 11/786,671

(22) Filed: Apr. 12, 2007

(65) Prior Publication Data

US 2007/0243460 A1 Oct. 18, 2007

(51) Int. Cl.
*H01M 2/14* (2006.01)
*H01M 10/42* (2006.01)
*H01M 2/16* (2006.01)
*H01M 10/052* (2010.01)

(52) U.S. Cl.
CPC ...... *H01M 10/4235* (2013.01); *Y10T 29/49108* (2015.01); *H01M 2/1646* (2013.01); *H01M 2/1653* (2013.01); *H01M 2/166* (2013.01); *H01M 2/1686* (2013.01); *H01M 10/052* (2013.01)

(58) Field of Classification Search
CPC ...................................................... H01M 2/14
USPC ........................................................ 429/61
See application file for complete search history.

(56) References Cited

U.S. PATENT DOCUMENTS

| | | | |
|---|---|---|---|
| 4,650,730 A | 3/1987 | Lundquist et al. | |
| 6,329,789 B1 | 12/2001 | Gavrilov et al. | |
| 6,482,545 B1 | 11/2002 | Skotheim et al. | |
| 7,595,130 B2 * | 9/2009 | Kawabata et al. | 429/144 |
| 2005/0266305 A1 * | 12/2005 | Ohata et al. | 429/144 |
| 2006/0127753 A1 * | 6/2006 | Nakashima et al. | 429/142 |
| 2006/0222954 A1 * | 10/2006 | Skotheim et al. | 429/246 |

FOREIGN PATENT DOCUMENTS

| | | | |
|---|---|---|---|
| WO | WO 2005022674 | * | 3/2005 |
| WO | 2007120763 | | 10/2007 |

OTHER PUBLICATIONS

International Search Report, dated Oct. 18, 2007, received in International Patent Application No. PCT/US07/09024, 2 pgs.
International Preliminary Report on Patentability, dated Oct. 14, 2008, received in International Patent Application No. PCT/US07/09024, 5 pgs.

* cited by examiner

*Primary Examiner* — Ula C Ruddock
*Assistant Examiner* — Jacob Marks
(74) *Attorney, Agent, or Firm* — Finch & Maloney PLLC

(57) ABSTRACT

The present invention pertains to electrochemical cells which comprise (a) an anode; (b) a cathode; (c) a solid porous separator, such as a polyolefin, xerogel, or inorganic oxide separator; and (d) a nonaqueous electrolyte, wherein the separator comprises a porous membrane having a microporous coating comprising polymer particles which have not coalesced to form a continuous film. This microporous coating on the separator acts as a safety shutdown layer that rapidly increases the internal resistivity and shuts the cell down upon heating to an elevated temperature, such as 110° C. Also provided are methods for increasing the safety of an electrochemical cell by utilizing such separators with a safety shutdown layer.

15 Claims, No Drawings

US 9,070,954 B2

SAFETY SHUTDOWN SEPARATORS

STATEMENT OF GOVERNMENT RIGHTS

This invention was made with government support under Grant Number DE-FG02-02ER83542 awarded by the U.S. Department of Energy. The government has certain rights in the invention.

RELATED APPLICATIONS

This application claims the benefit of U.S. Provisional Patent Application No. 60/791,268, filed Apr. 12, 2006, entitled "Safety Shutdown Separators," by S. Carlson, et al., which is incorporated herein by reference.

FIELD OF THE INVENTION

The present invention relates generally to the field of porous membranes and to the fields of electrochemical cells and of separators for use in electrochemical cells. More particularly, this invention pertains to electrochemical cells and separators for electrochemical cells wherein the separator has a safety shutdown layer that rapidly shuts down the cell at a threshold temperature. The present invention also pertains to methods for increasing the safety of an electrochemical cell by utilizing such separators with a safety shutdown layer.

BACKGROUND

Throughout this application, various publications, patents, and pending patent applications are referred to by an identifying citation. The disclosures of the publications and patents referenced in this application are hereby incorporated by reference into the present disclosure to more fully describe the state of the art to which this invention pertains.

Thermal runaway and other heat-related safety problems with lithium-ion and other lithium-based batteries are well known. Because of the relatively low initiation temperature and rapid exothermic nature of thermal runaway, a heat-activated shutdown of the lithium battery is needed at a temperature well below the melting point of lithium at 179° C. and the rapid vaporization of the organic electrolyte solvents around this same temperature range. A rapid thermal shutdown at a temperature of 135° C. or lower, preferably in the range of 100° C. to 110° C., is highly desirable. As lithium-based batteries become more energetic and are increasingly utilized for high power applications such as hybrid electric vehicles (HEVs), the need for rapid thermal shutdown of the cells increases.

A variety of tests are used to evaluate the safety of batteries against heat buildup. These tests include, for example, heating the battery cell in an oven for 30 minutes at 150° C., overcharging the cell, and internal short-circuiting of the cell.

One approach to thermal shutdown of lithium-based batteries is adding a positive thermal coefficient (PTC) device to the circuitry of the lithium-based cell. The PTC device increases its resistivity when the temperature increases. This increased resistivity increases the internal resistance of the cell and causes the current producing operation of the cell to greatly diminish or to stop. This provides a level of safety although the PTC device is relatively expensive and adds weight, volume, and complexity to the design of the cell.

Another approach to thermal shutdown of lithium-based batteries is a multi-layer porous polyolefin separator approach where an inner layer of a low-melting plastic, such as polyethylene, has an outer layer of a high-melting plastic, such as polypropylene, on both sides. The low-melting porous plastic layer melts when the temperature of the cell exceeds its melting point and becomes non-porous. This increases the internal resistance of the cell by interfering with the diffusion of lithium ions and sharply lowering the conductivity of the electrolyte between the two electrodes of the cell. This provides a level of safety although the relatively high melting point of polyethylene at about 135° C. is significantly higher than the preferred shutdown range of 100° C. to 110° C. and the rate of its melting may not be fast enough for effective shutdown in some cases.

SUMMARY OF THE INVENTION

A thin microporous coating comprising a polymer latex that is non-coalescing under the application conditions of coating and drying is applied to the surface of a separator, such as, for example, to a polyolefin separator or to a sol gel or xerogel separator. When in contact with the nonaqueous electrolyte in the cell, this microporous and microrough coating coalesces when heated to a certain temperature, such as 110° C., to form a non-porous or substantially less porous layer that reduces the conductivity of the lithium battery electrolyte between the two electrodes by a large factor, typically by a factor of 200 or greater, thereby shutting down the operation of the battery and reducing or preventing further temperature buildup and/or thermal runaway.

An electrochemical cell of the present invention comprises (a) an anode; (b) a cathode; (c) a solid porous separator; and (d) a nonaqueous electrolyte, wherein the separator and the electrolyte are interposed between the anode and the cathode, and wherein the separator comprises a porous membrane having a microporous coating with a microrough surface, wherein the coating comprises polymer particles which have not coalesced to form a continuous film. In one embodiment, upon heating of the coating at a temperature, the internal resistivity of the cell increases to a level sufficient to safely terminate the current producing operation of the cell. In one embodiment, the temperature of the heating of the coating to terminate the operation of the cell is 150° C., preferably 130° C., more preferably 110° C., and most preferably 100° C. In one embodiment, the non-coalesced polymer particles comprise styrenated acrylic polymer particles.

In one embodiment of the electrochemical cell of this invention, the coating comprises the non-coalesced polymer particles and a colloidal metal oxide. In one embodiment, the metal oxide is a xerogel particle. In one embodiment, the metal oxide is an aluminum oxide. In one embodiment, the metal oxide is a zirconium oxide. In one embodiment, the metal oxide is a silica. In one embodiment, the porous membrane comprises one or more xerogel layers. In one embodiment, the porous membrane comprises one or more porous polyolefin layers. In one embodiment, the porous membrane comprises one or more porous inorganic oxide layers. In one embodiment, the coating has a thickness from 0.1 to 5.0 microns. In one embodiment, the coating has a thickness from 0.5 to 2.0 microns.

One method of the present invention for increasing the safety of an electrochemical cell comprises the steps of (a) providing a nonaqueous liquid electrolyte; (b) providing a solid porous separator; (c) incorporating the electrolyte and the separator into the electrochemical cell by interposing the electrolyte and the separator between a cathode and an anode; wherein the separator comprises a porous membrane having a microporous coating with a microrough surface, and wherein the coating comprises polymer particles which have not coalesced to form a continuous film. In one embodiment, upon heating of the coating at a temperature, the internal resistivity of the cell increases to a level sufficient to safely terminate the current producing operation of the cell.

A separator of this invention for use in a nonaqueous electrochemical cell comprises a porous membrane having a microporous coating with a microrough surface, wherein the coating comprises polymer particles which have not coalesced to form a continuous film. In one embodiment, the non-coalesced polymer particles comprise styrenated acrylic polymer particles. In one embodiment, the coating comprises the non-coalesced polymer particles and a colloidal metal oxide. In one embodiment, the metal oxide is a xerogel particle. In one embodiment, the metal oxide is an aluminum oxide. In one embodiment, the metal oxide is a zirconium oxide. In one embodiment, the metal oxide is a silica. In one embodiment, the porous membrane comprises one or more xerogel layers. In one embodiment, the porous membrane comprises one or more porous polyolefin layers. In one embodiment, the porous membrane comprises one or more porous inorganic oxide layers. In one embodiment, the coating has a thickness from 0.1 to 5.0 microns. In one embodiment, the coating has a thickness from 0.5 to 2.0 microns. In one embodiment, when the coating is in contact with a nonaqueous electrolyte, the coating coalesces to form a continuous film upon heating the coating at a temperature of 150° C., preferably 130° C., more preferably 110° C., and most preferably 100° C.

DETAILED DESCRIPTION OF THE INVENTION

Polyolefin-based shutdown separators typically utilize a porous polyethylene layer between two porous polypropylene layers. This type of shutdown separator functions at the melting point of polyethylene, which is about 135° C., and is a relatively slow thermal process compared to the time scale in seconds of thermal runaway at 135° C. in some lithium-based batteries. The microporous shutdown layers in the separators and cells of the present invention comprise non-coalescing polymer particles. By the selection of a particular non-coalescing polymer and optionally of other additives to the shutdown layer, different thermal shutdown temperatures may be obtained, including shutdown temperatures well below 135° C., such as at 100° C. or at 110° C. This approach is based on a separator with a non-coalescing polymer latex coating that coalesces upon heating in the presence of the electrolyte of the cell. It may provide a faster thermal shutdown process because of the much thinner microporous shutdown layer of typically 2 micron thickness or less and the typically smaller micropore sizes compared to the multi-layer polyolefin shutdown separators.

It has been suggested by Laman et al., J. Electrochem. Soc., 141, L51 to L53 (1993), that for a separator to function well as an internal safety device in a lithium battery, it should have the following characteristics: a melting point close to 100° C. for the low melting component, a high dimensional stability temperature preferably above the melting point of lithium at about 180° C., and a high degree and rate of shutdown, giving rise to an impedance increase of at least three orders of magnitude with an increase of a few degrees Celsius in temperature. They note that it is difficult to achieve these properties in a single separator and that obtaining all these characteristics can be more easily achieved by combining different separators. Using a combination of different polymeric separators, especially when the surface area of separators required in the battery is very large, significantly increases the expense of producing the battery, as well as reducing the volume available for electroactive material, thereby reducing the specific capacity of the cell.

The non-coalescing polymer latex shutdown coating of the present invention is preferably about 1 micron in thickness and may contain sub-micron pigments, such as aluminum oxides and silicas, to increase its mechanical properties and its rate of thermal shutdown while still retaining the microporous properties needed for good lithium ion conductivity and cell performance.

Particularly useful non-coalescing latex particles are the non-coalescing, non-film forming aqueous dispersed styrene-acrylic latex polymers from S.C. Johnson, Milwaukee, Wis., such as those available under the trade name of Joncryl including, for example, Joncryl 89 and Joncryl 2161. These non-coalescing Joncryl latex polymers are described in U.S. Pat. No. 5,308,680 to Desjarlais, et al., for use in image-receptive coatings for thermal mass transfer receiving sheets.

The non-coalescing polymer latex shutdown layer may be coated on one or both surfaces of a microporous separator, such as, for example, a polyolefin or xerogel separator. It may also be coated onto another layer of the cell, such as onto the anode or the cathode, to make, for example, a safety shutdown anode. Because it is a very thin coating and is easy to apply and to dry, the shutdown layer of this invention has the flexibility of being applied when the separator is extruded or coated, or at a later stage, for example, when the separator is being slit and when it is being wound into the cell. The shutdown coating of the present invention has the flexibility of adding other materials, such as, for example, plasticizers, metal oxide particles, and crosslinking agents, to enhance the thermal shutdown response and to improve the interface with the adjacent electrode surface in the battery or cell.

An electrochemical cell of the present invention comprises (a) an anode; (b) a cathode; (c) a solid porous separator; and (d) a nonaqueous electrolyte, wherein the separator and the electrolyte are interposed between the anode and the cathode, and wherein the separator comprises a porous membrane having a coating with a microrough surface, wherein the coating comprises polymer particles which have not coalesced to form a continuous film. The coating with a microrough surface might also be described as microporous. Micropores exist due to the non-coalescence of the polymer particles. During the coating, drying, and other processing of the dispersion of non-coalescing polymer particles, it is important to avoid heat and other conditions, such as the presence of coalescing solvents, that might result in the polymer particles coalescing to form a uniform, continuous, and non-porous film. In one embodiment, upon heating of the coating at a temperature, the internal resistivity of the cell increases to a level sufficient to safely terminate the current producing operation of the cell. In one embodiment, the temperature of the heating of the coating to terminate the operation of the cell is 150° C., preferably 130° C., more preferably 110° C., and most preferably 100° C. In one embodiment, the non-coalesced polymer particles comprise styrenated acrylic polymer particles.

The electrochemical cells of the present invention are preferably lithium-based cells wherein the anode in the charged state comprises lithium. The cathode of this invention may be any of the types of cathodes known in the art, preferably one of those known in the art of lithium-based cells. Suitable cathode active materials for the cathodes of the present invention include, but are not limited to, electroactive transition metal chalcogenides. Suitable solid porous separator materials include, but are not limited to, polyolefins, such as, for example, polyethylenes and polypropylenes, glass fiber filter papers, and ceramic materials. Usually these separator materials are supplied as porous free standing films which are interleaved with the anodes and the cathodes in the fabrication of electrochemical cells. Further examples of separators suitable for use in this invention are those comprising a microporous xerogel or sol gel layer as, for example, described in U.S. Pat. No. 6,497,780, to Carlson, or those comprising an inorganic oxide layer as, for example, described in U.S. patent application Ser. No. 11/652,948, titled "Separators for electrochemical Cells," to Carlson et al.

Although the electrochemical cells of the present invention may be utilized for a wide variety of primary and secondary batteries known in the art, it is preferred to utilize these cells in secondary or rechargeable batteries. The benefits of a temperature-induced shutdown of the cells of this invention may be employed to help the safety protection of secondary batteries through many repeated discharge and charge cycles when the anode and cathode active materials undergo many electrochemical reactions which may progressively lead to greater potential for thermal runaway and unsafe conditions at temperatures above the normal operating range and under other abusive conditions of cell usage.

The nonaqueous electrolyte of the present invention may be any of the types of nonaqueous electrolytes known in the art. In one embodiment, the nonaqueous electrolyte of this invention is selected from the group consisting of liquid electrolytes, gel polymer electrolytes, and solid polymer electrolytes. In a preferred embodiment, the electrolyte is a liquid electrolyte.

In one embodiment of the electrochemical cell of this invention, the coating comprises the non-coalesced polymer particles and a colloidal metal oxide. In one embodiment, the metal oxide is a xerogel particle. In one embodiment, the metal oxide is an aluminum oxide. In one embodiment, the metal oxide is a zirconium oxide. In one embodiment, the metal oxide is a silica. In one embodiment, the porous membrane comprises one or more xerogel layers. In one embodiment, the porous membrane comprises one or more porous polyolefin layers. In one embodiment, the porous membrane comprises one or more porous inorganic layers. In one embodiment, the porous membrane comprises one or more porous xerogel layers and one or more porous polyolefin layers. In one embodiment, the porous membrane comprises one or more porous inorganic oxide layers and one or more porous polyolefin layers. Combining one or more xerogel layers or one or more inorganic oxide layers with one or more polyolefin layers may provide the dimensional stability at temperatures above 180° C., and even to above 300° C., that is available from xerogel or inorganic oxide separators to overcome the melting or loss of dimensional stability of polyolefin separators at temperatures below 180° C. In one embodiment, the coating has a thickness from 0.1 to 5.0 microns. In one embodiment, the coating has a thickness from 0.5 to 2.0 microns.

One method of the present invention for increasing the safety of an electrochemical cell comprises the steps of (a) providing a nonaqueous liquid electrolyte; (b) providing a solid porous separator; (c) incorporating the electrolyte and the separator into the electrochemical cell by interposing the electrolyte and the separator between a cathode and an anode; wherein the separator comprises a porous membrane having a microporous coating with a microrough surface, and wherein the coating comprises polymer particles which have not coalesced to form a continuous film. In one embodiment, upon heating of the coating at a temperature, the internal resistivity of the cell increases to a level sufficient to safely terminate the current producing operation of the cell.

A separator of this invention for use in a nonaqueous electrochemical cell comprises a porous membrane having a microporous coating with a microrough surface, wherein the coating comprises polymer particles which have not coalesced to form a continuous film. In one embodiment, the non-coalesced polymer particles comprise styrenated acrylic polymer particles. In one embodiment, the coating comprises the non-coalesced polymer particles and a colloidal metal oxide. In one embodiment, the metal oxide is a xerogel particle. In one embodiment, the metal oxide is an aluminum oxide. In one embodiment, the metal oxide is a zirconium oxide. In one embodiment, the metal oxide is a silica. In one embodiment, the porous membrane comprises one or more xerogel layers. In one embodiment, the porous membrane comprises one or more porous polyolefin layers. In one embodiment, the porous membrane comprises one or more porous xerogel layers and one or more porous polyolefin layers. In one embodiment, the coating has a thickness from 0.1 to 5.0 microns. In one embodiment, the coating has a thickness from 0.5 to 2.0 microns. In one embodiment, when the coating is in contact with a nonaqueous electrolyte, the coating coalesces to form a continuous film upon heating the coating at a temperature of 150° C., preferably 130° C., more preferably 110° C., and most preferably 100° C.

EXAMPLES

Several embodiments of the present invention are described in the following examples, which are offered by way of illustration and not by way of limitation.

Example 1

An inorganic oxide separator for use in evaluating safety shutdown layers on the separator was prepared from a 15% solids blend of 80:13.5:11:5.5:6.2:0.42 by weight of Celvol 165:Dispal 10F4:ethylene carbonate:PEO (average molecular weight of about 200):DVE-3:Zonyl FSO-100 in water with 2% glacial acetic acid by coating with a #80 wire wound rod to a dry thickness of 20 microns. Celvol is a tradename for polyvinyl alcohol polymers available from Celanese Corporation, Dallas, Tex. Dispal is a tradename for aluminum boehmite sol powders available from Sasol Corporation, Houston, Tex. PEO is the acronym for polyethylene oxide. DVE-3 is the tradename for the divinyl ether of triethylene glycol available from ISP Corporation, Wayne, N.J. Zonyl is the tradename for fluorosurfactants available from E. I. DuPont, Wilmington, Del. The coating was done onto a 3 mil thick silicone-coated polyester film and dried at 120° C. for 6 minutes. The coating was easily delaminated from the silicone release surface to provide a 20 micron thick free-standing inorganic oxide separator. This free-standing separator was heated at 160° C. to further enhance its physical strength and flexibility and its ionic conductivity with lithium salt electrolytes. The porosity of the inorganic oxide separator was 52%. This porosity value was found both when measured by weighing the amount of DVE-3 imbibed into the pores of the separator and also when measured by mercury porosimetry and specific surface area analysis of the pores.

To prepare the coating solution for the safety shutdown layer, the Joncryl latex was diluted to 5% solids with a solution of 1:1 water:methanol and coated two successive times with a #3 wire wound rod onto the separator with 5 minutes of drying at 80° C. for each coating pass. The thickness of the overall safety shutdown layer was about 1 micron. Joncryl 2161, which has a glass transition temperature of 90° C., shut down in the range of 130° C. to 135° C. when heated in air.

This shutdown was measured by the change in Gurley air porosity before and after heating and also by the change in ionic conductivity of the separator with the safety shutdown coating on one surface in a lithium salt electrolyte using an impedance analyzer, before and after heating. The Gurley air porosity is a standard test for battery separators and measures the time that it takes for 100 cm$^3$ of air under a specified pressure to pass through the separator. When this time increases dramatically, such as from 1 minute to over 60 minutes, the separator is considered to be non-porous and shut down as far as not permitting enough ionic conductivity for a lithium-based battery to operate. The ionic conductivity measurement is more direct, and a drop of at least 200-fold in ionic conductivity is an industry standard for very effective shutdown. The impedance spectra were measured on an Agilent 4294A impedance analyzer at 40 frequencies distributed logarithmically between 500 Hz and 100 kHz.

In the lithium-based battery, the separator and safety shutdown layer is wet with a lithium salt electrolyte, which typically comprises a lithium salt, such as lithium hexafluorophosphate or lithium tetrafluoroborate, and various organic carbonate and ether solvents, such as ethylene carbonate and dimethyl carbonate. The safety shutdown layers comprising non-coalesced polymer particles of this invention will have a shutdown temperature that is influenced by the plasticization effects of the electrolyte. By the term "plasticization," as used herein, is meant an effect from adding a material to a polymer material or composite that alters its coalescing temperature, melting point, glass transition temperature, and viscoelastic and other physical properties. It is important that the safety shutdown layer not be significantly soluble in the electrolyte because this would remove the shutdown layer prematurely and introduce possible contaminants into the electrolyte. Accordingly, the safety shutdown layers of the present invention typically have less than 1% by weight solubility in the electrolyte at temperatures up to 95° C., but show evidence of plasticization effects which determine the shutdown temperatures.

For example, placing the inorganic oxide separator and shutdown layer of Example 1 in a container of ethylene carbonate and heating this slowly using a controlled temperature bath showed a shutdown temperature of about 85±5° C. as measured by Gurley air porosity increases from about 3 minutes before heating to over 60 minutes after heating. The separator samples from the ethylene carbonate solution were rinsed with methanol before making the Gurley air porosity measurements. This is in contrast to the shutdown temperature for the same safety shutdown layer comprising Joncryl 2161 on inorganic oxide separator of 130° C. to 135° C. when heated in air. Although not wishing to be bound by any particular theory, this result suggests that the presence and nature of the electrolyte environment plays a role in determining the shutdown temperature, likely through a plasticization process with the non-coalesced polymer particles.

Example 2

The same experiments as described in Example 1 were carried out using Joncryl 89 in place of Joncryl 2161. Joncryl 89 has a glass transition temperature of 98° C. and was not observed to shut down when heated in air at temperatures up to 150° C. When the sol gel separator with a safety shutdown layer comprising Joncryl 89 was submerged in ethylene carbonate and heated, the shutdown temperature was 85±5° C. As described in Example 1, this result also supports an influence of the electrolyte on the shutdown temperature, likely through a plasticization process with the non-coalesced polymer particles.

The much higher coalescing or shut down temperatures of the safety shutdown layers of this invention when heated in air compared to when heated in an electrolyte solvent or mixture is advantageous in manufacturing these layers. The much higher shut down temperature in air allows the coating to be dried when applied to the separator layer at a much higher temperature for fast speed drying and otherwise vacuum dried at elevated temperatures without concerns about prematurely shutting down the safety shutdown layer on the separator.

The size of the non-coalescing polymer particles at about 100 to 150 nm in diameter is particularly suited for coating onto the inorganic oxide separators or the xerogel separators, which typically have pore diameters of less than 50 nm and thereby prevent the non-coalescing polymer particles from penetrating into the inorganic oxide or the xerogel layer.

Example 3

The inorganic oxide separator and shutdown layer comprising Joncryl 2161 of Example 1 was measured for shutdown performance in a 0.02M solution of lithium tetrafluoroborate ($LiBF_4$) in ethylene carbonate with the separator sandwiched between two aluminum-coated polyester films that acted as electrodes. The electrolyte solution was stirred slowly with a magnetic stirrer to provide fast thermal equilibrium as the temperature of the solution was slowly increased from 55° C. to 100° C. over a 45 minute period. Shutdown as shown by a 12-fold decrease in conductivity occurred between 80° C. and 90° C. There was an increased shutdown starting at 120° C. that resulted in an overall 20-fold decrease in conductivity by 140° C.

Example 4

The same experiments as described in Example 3 were carried out using Joncryl 89 in place of Joncryl 2161. The shutdown temperature was about 100° C. with a shutdown factor of decreased conductivity of about 100-fold. These separator samples with a shutdown layer comprising Joncryl 89 were measured for the rate of shutdown at various temperatures. A very slow shutdown initiates around 72° C. Extrapolating the data from conductivity changes over a 2 hour period, it would take an estimated 6 hours at 72° C. to reach a shutdown factor of 2, i.e., for the conductivity to drop by a factor of 2. At 76° C., it took about 13 minutes to reach a shutdown factor of 2. At 84° C., it took about 4 minutes to reach a shutdown factor of 2. Assuming an Arhennius equation behavior, the rate of shutdown at 110° C. is estimated as an increase of 1 in the shutdown factor every 1.2 seconds so that, for example, 2 minutes at 110° C. is estimated to give a shutdown factor of 100. This would substantially or completely shut down the operation of the lithium-based battery or cell depending on the type of cell and the operating conditions.

Example 5

The same experiments as described in Example 3 were carried out except that various Joncryl latex materials were used instead of Joncryl 2161. Inorganic oxide separators with shutdown layers comprising Joncryl 538, 537, or 1655 all became more conductive as the temperature increased. This likely indicates that they were too soluble in the electrolyte and dissolved at higher temperatures in the 60° C. to 120° C. range.

Sol gel separators with shutdown layers comprising Joncryl 2153, 2189, 631, and 636 showed shutdown temperatures of 73° C., 85° C., 85° C., and 110° C. with shutdown factors of decreased conductivity of about 10-fold, 5-fold, 100-fold, and 20-fold, respectively. The separators with the shutdown layers comprising Joncryl 2189 also showed a second shutdown temperature at 145° C.

Example 6

The same experiments as described in Example 4 were carried out using various coating passes, thicknesses, and coating solvents with Joncryl 89. A 4.75% solids solution of Joncryl 89 diluted with 1:1 methanol:water was coated with 1, 2, 3, and 4 coating passes, respectively, with each coating dried for 5 minutes at 80° C. after each coating pass. Also, 1 and 2 coating passes of a 4.75% solids solution of Joncryl 89 diluted with methanol and dried at 80° C. after each pass were coated on the inorganic oxide separator. Each coating pass provides about a 0.5 micron thick microporous layer of non-coalesced polymer particles. All six samples showed shutdown in the 80° C. to 90° C. range. In both solvent cases, the shutdown layers with two coating passes were better than those with one coating pass in terms of the level and the sharp transition with temperature of the increase in the shutdown factor. There was no significant advantage in going to 3 or 4 coating passes. The coatings diluted with pure methanol were not quite as good in shutdown factor response as the coatings diluted with the methanol:water blend.

While the invention has been described in detail and with reference to specific and general embodiments thereof, it will be apparent to one skilled in the art that various changes and modifications can be made therein without departing from the spirit and scope thereof.

The invention claimed is:

1. An electrochemical cell comprising:
   (i) an anode;
   (ii) a cathode;
   (iii) a solid porous separator; and
   (iv) a nonaqueous electrolyte, wherein said separator and said electrolyte are interposed between said anode and said cathode;
   and wherein said separator comprises an inorganic oxide separator layer having a microporous coating on one side of said separator layer, wherein said microporous coating comprises styrenated acrylic polymer particles having a diameter of between 100 and 150 nm.

2. The cell of claim 1, wherein the internal resistivity of said cell increases to a level sufficient to safely terminate the current producing operation of said cell at a temperature in the presence of said electrolyte.

3. The cell of claim 2, wherein said temperature is 150° C.

4. The cell of claim 2, wherein said temperature is 130° C.

5. The cell of claim 2, wherein said temperature is 110° C.

6. The cell of claim 2, wherein said temperature is 100° C.

7. The cell of claim 1, wherein said microporous coating comprises said polymer particles and a colloidal metal oxide.

8. The cell of claim 7, wherein said metal oxide is a xerogel particle.

9. The cell of claim 7, wherein said metal oxide is an aluminum oxide.

10. The cell of claim 7, wherein said metal oxide is a zirconium oxide.

11. The cell of claim 7, wherein said metal oxide is silica.

12. The cell of claim 7, wherein said non-coalesced polymer particles comprise styrenated acrylic polymer particles.

13. The cell of claim 1, wherein said microporous coating has a thickness from 0.1 to 5.0 microns.

14. The cell of claim 1, wherein said microporous coating has a thickness from 0.5 to 2 microns.

15. An electrochemical cell comprising:
   (i) an anode;
   (ii) a cathode;
   (iii) a solid porous separator; and
   (iv) a nonaqueous electrolyte, wherein said separator and said electrolyte are interposed between said anode and said cathode;
   and wherein said separator comprises an inorganic oxide separator layer having a microporous coating on one side of said separator layer, wherein said microporous coating comprises styrenated acrylic polymer particles having a diameter of between 100 and 150 nm wherein said separator shuts down by increasing the Gurley air porosity of said separator to above 60 minutes/100 $cm^3$ at a temperature at least 40° C. below the temperature at which said separator shuts down when heated in air with none of said electrolyte present.

* * * * *